March 19, 1957 K. KIRCHHÜBEL 2,785,598
MANUALLY OPERATED OPHTHALMOLOGICAL INSTRUMENT
FOR EXAMINATIONS OF THE EYE
Filed July 15, 1952 3 Sheets-Sheet 1
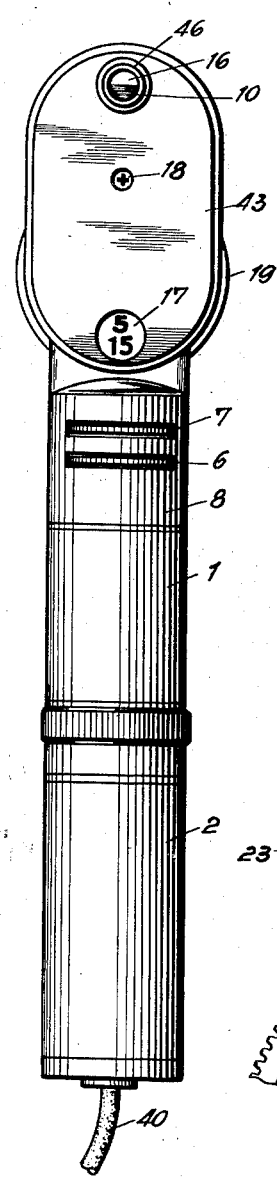
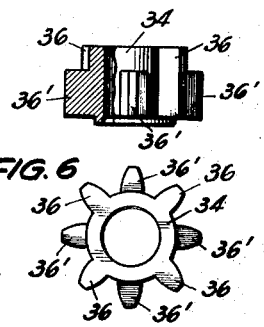
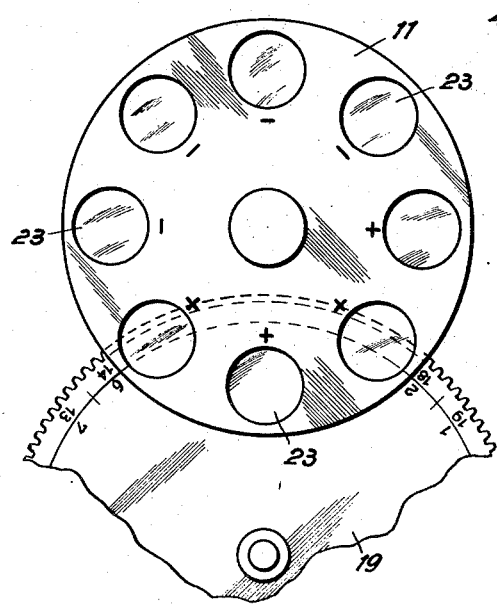
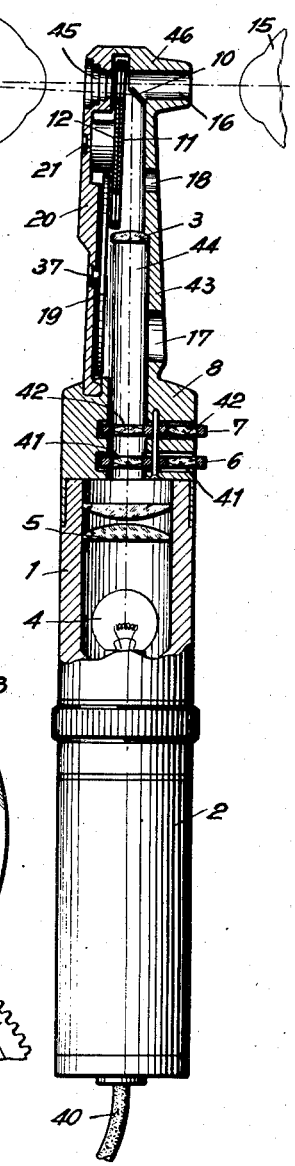
INVENTOR

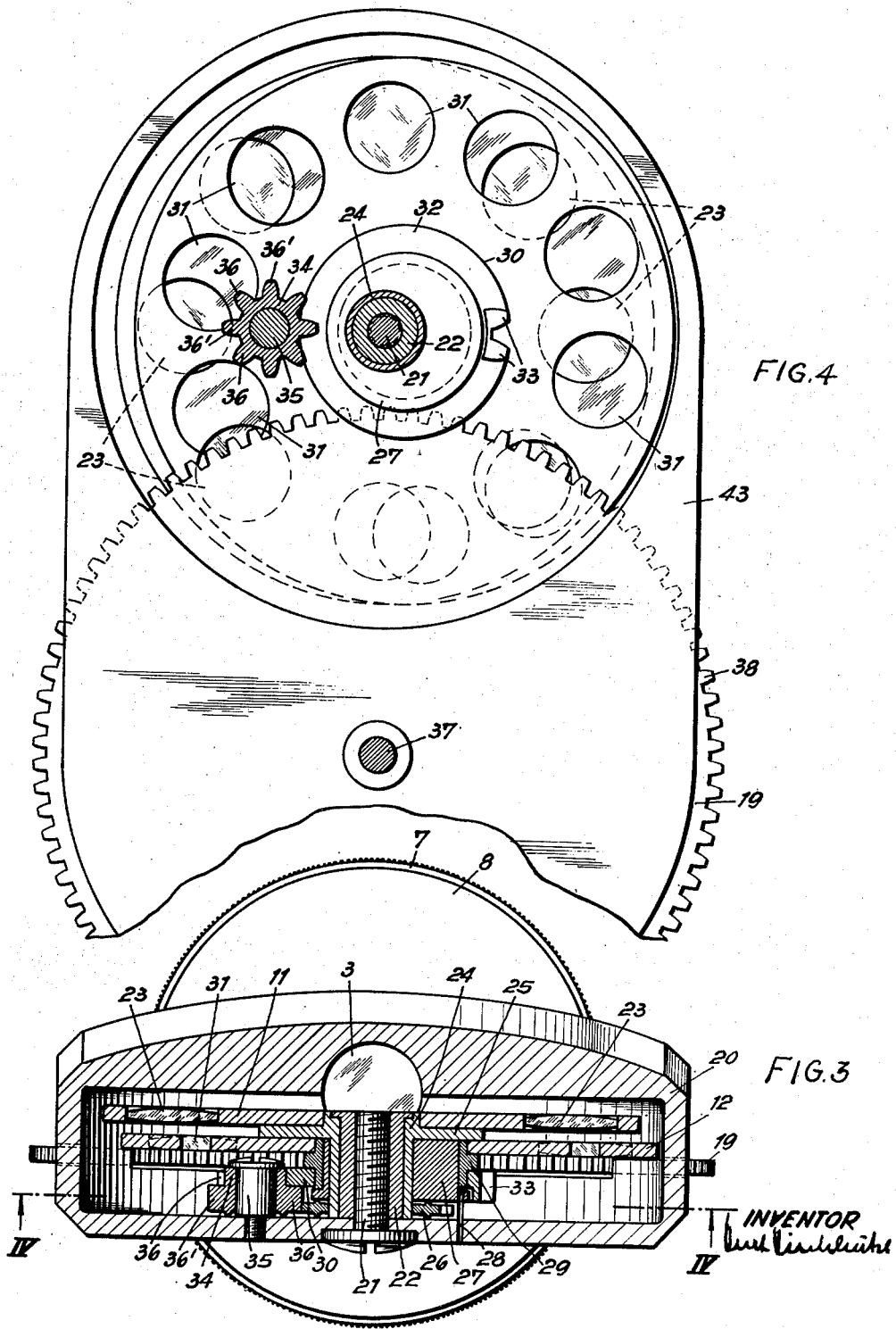

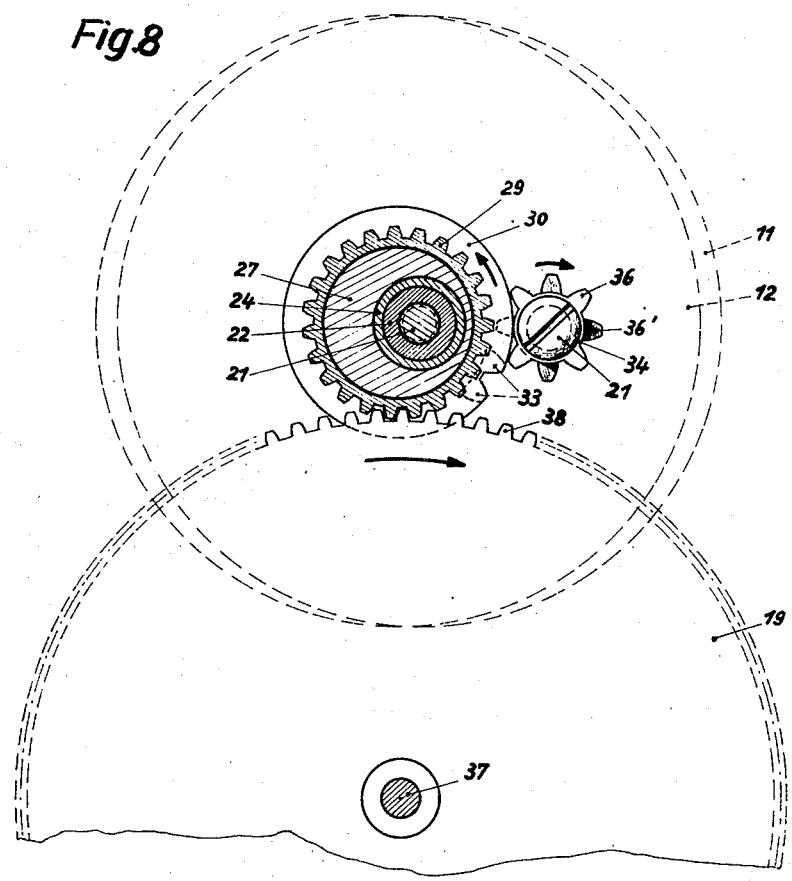
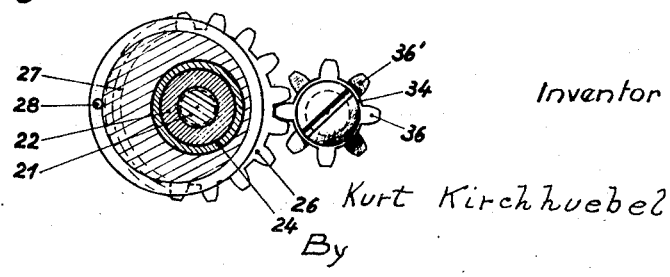

United States Patent Office 2,785,598
Patented Mar. 19, 1957

2,785,598

MANUALLY OPERATED OPHTHALMOLOGICAL INSTRUMENT FOR EXAMINATIONS OF THE EYE

Kurt Kirchhübel, Dutenhofen, near Wetzlar, Germany, assignor to Oculus-Optikgeräte G. m. b. H., Dutenhofen, near Wetzlar, Germany Application July 15, 1952, Serial No. 298,899

Claims priority, application Germany January 17, 1952

3 Claims. (Cl. 88—22)

The present invention relates to a manually operated ophthalmological instrument for examinations of the eye, and has for its object the construction of a manually operated ophthalmological apparatus suited for an objective determination of visual defects, or for the examination of the retina of the eye, or for the measuring of abnormal changes of the retina of the eye.

One particular object of the invention is the construction of a device by means of which all of the aforesaid examinations and measurements can be selectively carried out.

For the determination of an eye defect or for the sharp representation of a test-mark on the retina of the eye by means of an instrument of this kind, a large number of finely stepped or graduated lenses within the range of between −20 to +20 diopters are needed, whereby the apparatus must be so devised that the lenses can be successively introduced into the path of the light-rays leading from the source of light of the instrument to the eye to be examined. For the observation of the test-marks on the retina of the eye it is further necessary that the same number of lenses are arranged also in the path of the light-rays leading from the eye to be examined to the eye of the operator of the device. But the arrangement of two large sets of lenses in a manually operated apparatus is practically impossible. That is why most of the known devices of this kind are provided only with one single set of lenses, or with one set of lenses and a shiftable objective for the sharp adjustment of the test-mark on the retina of the eye. But the manipulation of an instrument of the latter type is very complicated.

Hence, another object of the invention is the construction of a manually operatable ophthalmological instrument of comparatively small size permitting the introduction of a finely graduated lens combination not only into the path of the light-rays leading from the source of light to the eye to be examined, but also into the path of the light-rays leading from the eye of the patient to the eye of the operator of the apparatus. That is why the instrument of the invention has been so devised that the illumination of the retina of the eye and the representation of the test-marks on the retina of the eye, as well as the observation of the retina and the test-marks can be carried out through the same lenses. A construction of this novel type requires only one finely graduated lens combination.

In known ophthalmological instruments of this kind the customary means for producing a finely graduated lens combination consist of two Recoss disks, of which one is provided with lenses of roughly graduated diopter values, while the other one is provided with lenses of finely graduated diopter values, whereby the disks are so positioned that through arrangement of roughly and finely graduated lenses behind one another intermediate values can be adjusted. However, the hitherto known arrangement of the two lens carriers with respect to each other is such that it makes the apparatus unhandy and that it renders the adjustment of the lenses at the proper distance from the eye comparatively difficult. Another drawback of the refractometer consisting of two lens carriers is the necessity that the diopter value for the eye defect adjusted at the examination has to be ascertained through calculation, whereby in each case the diopter values of the adjusted lenses of the two lens carriers have to be either added to or subtracted from each other. When a calculation like this has to be made there is always the possibility that mistakes may occur, particularly because the diopter values of the adjusted lenses have to be read off at different places of the instrument. Still another drawback of known devices in which the lenses are distributed over two lens carriers resides in the feature that for obtaining the required finely stepped graduation of the aforesaid range between −20 and +20 diopters a comparatively large number of lenses is needed.

That is why the invention further contemplates the construction of a manually operated device provided with two rotatably mounted lens carriers of the Recoss-disk type which in spite of the use of two lens carriers possesses a concentrated form permitting the easy manipulation of the device as well as the easy adjustment of the lenses at the correct distance from the eye, in which, furthermore, the adjusted diopter value resulting from an addition or subtraction of the lenses arranged behind one another can be read off without calculation at a scale, that is to say, at one place of the device, and in which by means of a comparatively small number of lenses a finely stepped graduation of the aforesaid measuring range can be attained.

In order to make the diopter values indicated by the scale discernible to the eye of the observer even in a darkened room, the device of the invention is so constructed that the scale and the portion of the latter confronting the observation opening are arranged within the instrument in such a position that the light-ray passing from the source of light of the apparatus to the eye to be examined is passing between the scale and the observation opening, so that the scale value appearing in the observation opening is illuminated by it.

Additional features and advantages of the invention will be understood from a consideration of the following detailed description taken in connection with the accompanying drawings, forming a part of this specification, and in which I have illustrated by way of example an embodiment of my invention. However, I wish to say that my invention is not confined to any strict conformity with the showing of the drawings, but may be changed or modified, so long as such changes or modifications mark no material departure from the salient features of the invention as expressed in the appending claims.

In the drawings in which like parts are referred to by the same reference numerals Fig. 1 is a front elevation of a messophthalmoscope as disclosed in the present invention;

Fig. 2 is a side elevation, partly in section, of the instrument of Fig. 1;

Fig. 3 is a sectional view, on an enlarged scale, of the lens carriers and of the actuating means of the latter;

Fig. 4 is a sectional view taken on line IV—IV of Fig. 3 seen in the direction of the arrows;

Fig. 5 is a detail view of the carrier of lenses of roughly graduated diopter values and of the operating disk for the lens carriers;

Figs. 6 and 7 are detail views showing the construction of the pinion; and

Figs. 8 and 9 are side views partly in section of the lens disk moving mechanism.

Referring now to the drawings in detail, the reference numeral 1 denotes the handle of the device provided with the detachable part 2. The hollow interior of the handle 1 may be utilized for the storing therein of a battery, or for the introduction thereinto of the conducting wires 40 for the lamp 4. The reference numeral 5 designates the customary condenser. Rotatably arranged above the condenser 5 in slots of a top part 8 are two circular disks 6 and 7 in such a way that the knurled edges of the disks are projecting from the outer surface of the part 8. The disk 6 is provided with test-marks of various forms, such as are customary for eye examination. The disk 7 is provided with color filters 42 of various colors in order to make it possible for the operator of the device to examine the retina of the eye with the aid of various colors of light. The aforesaid top part consists of a tubular portion 8 provided with the disks 6 and 7, of a front wall 43, and of a detachable cover 20. Positioned in a cut-out portion of the front wall 43 are a projector lens 3 and a mirror or prism 10 which is arranged at an inclined angle of 45° and by means of which the light-ray is deflected in such a way that it passes through the lenses 23, 31 of the lens carriers 11 and 12. The lens carriers 11 and 12 are arranged at the detachable cover 20 which is provided with an opening 45 for the passage of the light-ray. The opening 45 and the opening 16 in the wall 43 of the top part register. As shown in Figs. 1 and 2, the mirror 10 covers up only half of the lenses 23, 31. The way which the rays are passing during the examination of the eye is indicated in Fig. 2. The eye to be examined is marked 13, while the reference numeral 14 denotes the background of the eye. The light-rays reflected from the retina of the eye are passing through the lenses 23, 31 above the upper edge of the mirror 10 and are observed by the eye 15 of the operator likewise through the lenses 23, 31 of the lens carriers 11 and 12. It will be seen, therefore, that in an arrangement like this one lens combination suffices for the sharp adjustment of the test-marks on the retina of the eye and for the elimination of the eye deflect during the observation of the test-marks.

As illustrated in Fig. 1, the observation opening 16 is positioned near the upper edge of the wall 43, so that the observation can be carried out without difficulty. The wall 43 is further provided with an opening 17 for the inspection of the diopter values, and with an opening 18, in which either a plus or a minus sign appears. Arranged at the cover 20 for the rotation of the lens carriers 11 and 12 is an operating disk 19 which is provided with a gear rim and which is so dimensioned that its edges are laterally projecting from the cover 20.

Fastened to the cover 20 by means of a screw 21 is a bushing 22 (see Fig. 3) for the rotatable support of the roughly graduated lens carrier 11 in which at uniform distances from one another eight lenses 23 (Fig. 4) having the diopter values 0, −5, −10, −15 and +5, +10, +15, +20 are arranged. The lens carrier 11 is fastened to a flange 25 of a hub-shaped part 24 to the rear end of which a gear wheel 26 is rigidly secured.

Eccentrically mounted on the hub 24 between the flange 25 and the gear wheel 26 is a sleeve 27, which is secured against rotation by a pin 28 fastened in the cover 20, and which serves as support for the gear wheel 29 to which are rigidly connected the lens carrier 12 and the driving wheel 30 of a Geneva motion drive. The lens carrier 12 is provided with ten lenses 31 having the diopter values 0, −0.5, −1, −1.5, −2, −2.5, −3, −3.5, −4, −4.5. The lenses 23 and and 31 register when they are in their uppermost position (see Fig. 3).

The driving wheel 30 (see Fig. 4) consists of a disk-shaped part 32 and of two teeth 33 fastened to said disk-shaped part 32. The driven pinion gear 34 is rotatably mounted on a pivot 35 fastened in the cover 20. The pinion 34 is provided with eight teeth 36, and every second tooth 36' has only half the width of the adjacent teeth 36, so that the disk 32 is enabled to engage between two teeth 36 and to stop the pinion 34. The disk 32 is provided between the teeth 33 with a recess, so that the teeth 33 are enabled to feed the pinion 34 forward for the distance between the tops of two adjacent teeth, whereupon at the end of each feeding action the pinion is stopped again.

The pinion 34 is in mesh with the gear wheel 26 secured to the rear end of the hub 24. Because of the eight-division of the lens carrier 11 the gear wheel 26 has to rotate through an angle of 45° at every rotatory movement of the pinion 34. Furthermore, as during a rotation of the gear wheel 29 (and consequently also of the teeth 33) through an angle of 36° (in conformity with the ten-division of the lens carrier 12) the gear wheel 26 has to be rotated for an angle of 45°, it is necessary to arrange the axes of rotation of the gears 29 and 26 at different distances from the axis of rotation of the pinion 34. For this purpose the aforedescribed sleeve 27 has been provided with an eccentrically arranged bore by which the position of the axes of rotation is displaced for a certain amount as indicated in Fig. 4. The amount of displacement is small as long as the number of the lenses provided in the two lens carriers differs but slightly from each other. As will be seen from Fig. 3, the lens carrier 11 advances to the extent of one lens division at every complete rotation of the lens carrier 12, so that by means of the hereinbefore described arrangement of lenses in both of the carriers a measuring range of from −20 to +20 can be divided up into measuring steps of 0.5 diopters.

Rotation of the gear wheel 29 is effected by means of the operating disk 19, which is rotatably mounted on a pivot 37 and provided with a gear rim 38. In the selected lens combination the diameter of the disk 19 is four times as large as that of the gear wheel 29, so that one revolution of the disk 19 results in four revolutions of the lens carrier 12, that is to say, to the setting of the diopter values from 0 to +20, or the diopter values from 0 to −20 in measuring steps of 0.5 diopters. The disk 19 is provided with two annular scales covering 360° (see Fig. 5) and of which one indicates the plus values while the other one indicates the minus values. The two scales are preferably of different colors. The values applicable at a time can be read off through the opening 17 (see Fig. 1). The lens carrier 11 which likewise is serving as scale support is provided in the embodiment illustrated in Fig. 5 beneath each of the lenses 23 with a plus or minus sign, depending on whether a plus or minus lens is positioned in the observation opening 16. These signs are perceptible through the opening 18 and indicate if the plus or minus scale has to be read off. For the sake of convenience the plus signs should be of the same color as the plus scale, while the minus signs should have the color of the minus scale.

From an inspection of Fig. 2 it will be seen that the light-ray of the lamp 4 is passing in a direction extending substantially parallel to the planes in which the operating disk 19 and the lens carrier 11 are positioned, illuminating in this way the operating disk 19 and the lens carrier 11 at the surfaces confronting the openings 17 and 18 and consequently also the figures or signs appearing in the two openings, so that the figures and signs are perceptible to the eye of the operator also in the dark.

For the examination of the retina of the eye by means of a test-mark, the operator first moves the selected test-mark into position through rotation of the disk 6, and after that the selected light-color through rotation of the disk 7. The instrument is then moved into testing position at a distance from the eye as indicated in Fig. 2. Next the disk 19 has to be rotated until the test-mark is clearly represented on the retina of the eye, whereby the retina of the eye is observed through the observation opening 16. The existing eye defect can then be read off through the opening 17. If the defect is positive or negative is indicated by a positive or negative sign appearing in the opening 18.

Every rotation of the disk 19 through an angle of 90° results in a complete rotation through 360° of the gear wheel 29 and of the lens carrier 12 rigidly secured to the gear wheel 29. Hence, every rotation through 90° of the disk 19 moves all of the lenses 31 of the lens carrier 12 in succession into registering position with the lens 23 of the lens carrier 11 positioned at that moment in the observation opening 16. In this way ten intermediate values are formed through one single revolution of the gear wheel 29. At the end of every complete revolution of the gear 29 the teeth 33 are forced into engagement with one of the teeth 36 of the pinion 34, feeding thereby the pinion forward for the distance between the points of two adjacent teeth. As a result of this forward feeding the gear wheel 26 meshing with the pinion 34 is likewise fed forward one step, and accordingly also the lens carrier 11, so that after every complete revolution of the gear 29 a new lens 23 appears in the observation opening 16. The next rotation of the disk 19 through 90° will form another 10 intermediate values, and as the lens carrier 11 is provided with eight lenses, it is obvious that in this way 80 different diopter values between −20 and +20 diopters can be adjusted.

What I claim as new and desire to secure by Letters Patent of the United States is:

1. In a manually operated ophthalmological instrument for the examination of the retina of the eye, for the measuring of abnormal changes of the retina of the eye, and for the objective determination of eye defects, a body part provided with a hollow inner passage and with two oppositely positioned observation openings at the observation end of said inner passage; a source of light arranged at the inner end of said inner passage; test-mark carrying means positioned for the selective support of test-marks in the path of light from said source of light through said inner passage to said observation openings; a lens combination adapted for the sharp representation of the test-mark on the retina of the eye adjustably arranged within said inner passage between said oppositely positioned observation openings; and a surface mirror positioned in the path of light between said observation openings before said lens combination, said mirror being so arranged that the light-ray from said source of light is thereby deflected and cast through the lower portion of the adjustable lens combination and one of said two oppositely positioned observation openings onto the retina of the eye to be examined, while simultaneously the observation of the retina of the eye by the operator of the device through the other one of said observation openings is effected over and across the upper edge of said mirror through the upper portion of the adjustable lens combination.

2. A manually operated ophthalmological instrument comprising a bearing bushing rigidly secured to the wall of the instrument; a hub rotatably mounted on said bushing and provided at one end with a flange; a lens carrier of the Recoss-disk type provided with a plurality of lenses of roughly graduated diopter values rigidly secured to said flange for rotation thereby; a gear wheel rigidly secured to the other end of said hub; a pinion in mesh with said gear wheel for rotation of the latter; a sleeve eccentrically mounted on said hub between said flange and said gear wheel; a pin fastened in the wall of the instrument and projecting into a recess of said sleeve to prevent rotation of said sleeve; a second gear wheel rotatably mounted on said eccentrically mounted sleeve; a second lens carrier of the Recoss-disk type provided with a plurality of lenses of finely graduated diopter values rigidly secured to one side of said eccentrically mounted second gear wheel adjacent said lens carrier provided with lenses of roughly graduated diopter values, said two lens carriers being arranged with respect to each other for rotation of their lenses into registering position for the formation of intermediate diopter values; a driving wheel consisting of a circular disk provided with two teeth rigidly secured to the other side of said eccentrically mounted second gear wheel which also carries said carrier of lenses of finely graduated diopter values and in mesh with said pinion for rotation of the latter in Geneva motion to thereby impart intermittent rotation from said second gear wheel carrying said carrier of lenses of finely graduated diopter values by means of the first-mentioned pinion and said gear wheel and said hub to said carrier of lenses of roughly graduated diopter values whereby the degree of rotation imparted to said carrier of lenses of roughly graduated diopter values depends upon the degree of eccentricity of said sleeve on which said second gear wheel is mounted; and an operating disk provided with a gear rim meshing with said second gear wheel for operation of said lens combination by the operator.

3. A manually operated ophthalmological instrument according to claim 2, in which said Geneva motion gearing being so arranged that every second one of the teeth of said pinion is of half the width of the adjacent teeth, and that said circular driving disk provided with two teeth engages in the gap provided by said teeth of smaller width, whereby it is in tangential contact with the side walls of the two adjacent teeth and thereby temporarily arrests said pinion until at the end of every complete rotation of said carrier of lenses of finely graduated diopter values renewed rotation is imparted by said teeth of said circular driving disk to said pinion for renewed rotation of said carrier of lenses of roughly graduated diopter values.

References Cited in the file of this patent
UNITED STATES PATENTS

| | | |
|---|---|---|
| 787,083 | De Zeng | Apr. 11, 1905 |
| 979,578 | Shigon | Dec. 27, 1910 |
| 1,431,782 | De Zeng | Oct. 10, 1922 |
| 1,566,652 | Clement | Dec. 22, 1925 |
| 1,666,406 | Clement et al. | Apr. 17, 1928 |
| 1,889,456 | Tillyer | Nov. 29, 1932 |
| 2,311,502 | Allyn | Feb. 16, 1943 |
| 2,322,878 | Peck et al. | June 29, 1943 |
| 2,370,514 | Arnesen | Feb. 27, 1945 |
| 2,453,888 | Allyn | Nov. 16, 1948 |
| 2,469,388 | Held | May 10, 1949 |